(No Model.)
J. A. DUGGAN.
BRACKET FOR SUPPORTING ELECTRIC CONDUCTORS.
No. 418,704.  Patented Jan. 7, 1890.
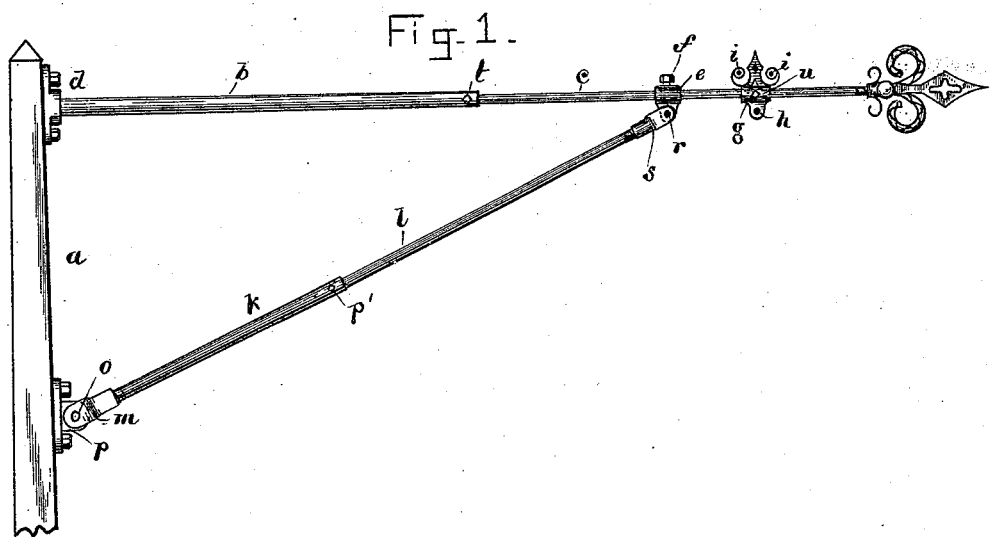
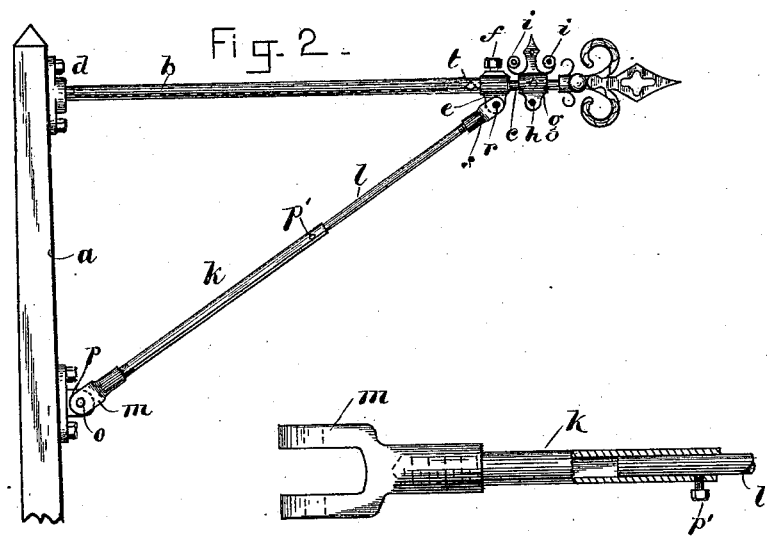

UNITED STATES PATENT OFFICE.

JOHN A. DUGGAN, OF QUINCY, MASSACHUSETTS.

BRACKET FOR SUPPORTING ELECTRIC CONDUCTORS.

SPECIFICATION forming part of Letters Patent No. 418,704, dated January 7, 1890.

Application filed April 19, 1889. Serial No. 307,706. (No model.)

*To all whom it may concern:*

Be it known that I, JOHN A. DUGGAN, a citizen of the United States, residing at Quincy, in the county of Norfolk and State of Massachusetts, have invented certain new and useful Improvements in Brackets for Supporting Electric Conductors; and I do hereby declare that the following is a full, clear, and exact description of the invention, which will enable others skilled in the art to which it appertains to make and use the same.

My invention relates to improvements in brackets for electric conductors, especially for the suspension of trolleys in connection with systems of electric railways; and it consists, essentially, in making the horizontal part of the bracket and its support each in two parts, one sliding or "telescoping," as it is commonly called, into the other, so that the trolley and electric conductors may be suspended at such a distance from the pole to which the bracket is attached as may be desired.

I have shown in Figure 1 an elevation of my invention attached to a pole, the bracket being drawn out to its greatest extent; in Fig. 2 the same with the bracket reduced to its shortest limits. Fig. 3 represents a detail, which will be hereinafter explained.

$a$ is the pole to which the bracket is attached.

$b$ is a rod of tubular form attached to the piece $d$, by means of which it is securely attached by screws to the pole $a$.

$c$ is a rod adapted to slide in and out of the tubular rod $b$, its position being regulated by means of the set-screw $t$. The rod $c$ passes through the collar $e$, in which is a set-screw $f$, by means of which the position of the collar $e$ upon the rod $c$ is regulated.

$l$ is a rod, having at its forward end the fork $s$, connected with an ear-piece on the under side of the collar $e$ by the pin $r$, so that the rod $l$ can freely turn upon the pin $r$. The opposite end of the rod $l$ is inserted in the tubular rod $k$, and may be adjusted therein by means of the set-screw $p'$, as shown in Fig. 3. At the opposite end the rod $k$ is attached to a fork $m$, (an enlarged plan view of which is shown in Fig. 3,) which is connected with the piece $p$ by means of a pin $o$, in such a way that it can freely turn thereon. The piece $m$ is attached by means of screws to the pole $a$.

$g$ is a collar adapted to slide easily along the rod $c$, (its position thereon being regulated by the set-screw $u$,) provided with the piece $h$, attached to its under side, by means of which the trolley is to be suspended.

$i\ i$ are holes through which may be placed guard-wires.

By means of the collar the trolley may be placed in any desired position. The same adjustment also moves the guard-wires, so that they are constantly kept in the same relative position to the trolley.

It will be readily seen that by loosening the several set-screws $t, f,$ and $p'$ the rod $c$ may be drawn out to any desired distance consistently with its length, or pushed in, and that the rod $l$ can be also drawn out or pushed in, so as to conform to the length of the horizontal part of the bracket, the supporting-rods $k$ and $l$ turning upon the pins $r$ and $o$, so as to adjust themselves to the new position. When the parts have been drawn out or pushed in to such position as may be desired, the set-screws are to be tightened. If the pole $a$ should be inclined on one side or the other, or not perfectly upright, the bracket can nevertheless be properly adjusted so as to be horizontal and hold the trolley properly suspended.

What I claim, and desire to secure by Letters Patent, is—

1. A bracket for the suspension of electric conductors, consisting of a horizontal rod made in two parts, one sliding within the other, and a supporting-rod similarly constructed, substantially as and for the purpose above described.

2. In a bracket for supporting electric conductors, a horizontal rod made in two parts, one sliding within the other and supported by a rod similarly constructed and provided at each end, respectively, with forks $s$ and $m$, in combination with the collar $e$ and pin $r$, the piece $p$, the rod $o$, and the pole $a$, substantially as and for the purpose above described.

3. The improved bracket for the support of electric conductors, consisting of the rods $b$ and $c$, set-screw $t$, collar $e$, set-screw $f$, rods $k$ and $l$, forks $m$ and $s$, pins $r$ and $o$, and collar $g$, from which the trolley is suspended, substantially as and for the purpose above described.

4. The adjustable collar $g$, provided with means to support guard-wire, substantially as above described.

JOHN A. DUGGAN.

Witnesses:
   BESSIE C. JONES,
   CHAS. H. DREW.